(12) United States Patent
Yamasaki

(10) Patent No.: US 7,936,699 B2
(45) Date of Patent: May 3, 2011

(54) ESTIMATION METHOD, DEVICE, AND PROGRAM, AND NETWORK MEASURING SYSTEM

(75) Inventor: Yasuhiro Yamasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 141 days.

(21) Appl. No.: 12/307,858

(22) PCT Filed: Jul. 5, 2007

(86) PCT No.: PCT/JP2007/063450
§ 371 (c)(1),
(2), (4) Date: Jan. 7, 2009

(87) PCT Pub. No.: WO2008/004616
PCT Pub. Date: Jan. 10, 2008

(65) Prior Publication Data
US 2009/0303892 A1 Dec. 10, 2009

(30) Foreign Application Priority Data
Jul. 7, 2006 (JP) ................................. 2006-187821

(51) Int. Cl.
H04L 12/26 (2006.01)
(52) U.S. Cl. ....................................................... 370/252
(58) Field of Classification Search .................. 370/252, 370/237, 351
See application file for complete search history.

(56) References Cited

U.S. PATENT DOCUMENTS
7,492,711 B1 * 2/2009 Cheung et al. ............. 370/230.1
2006/0029037 A1 * 2/2006 Chen et al. .................... 370/351

FOREIGN PATENT DOCUMENTS
JP 2002314597 A 10/2002
JP 2005039572 A 2/2005
JP 2006067217 A 3/2006

OTHER PUBLICATIONS

International Search Report for PCT/JP2007/063450 mailed Oct. 9, 2007.
Tomohiko Ogishi et al., "Design of Performance Monitor Collecting TCP Level Statistics from Unidirectional IP Traffic", 2000 Proceedings of the IEICE, B-7-3.
Yasuhiro Yamasaki et al., "TCP Packet Loss Measurement Technique in the High-Speed Network Environment", Technical Report of IEICE, vol. 105, No. 39, (May 5, 2005), pp. 57-62.
Toshiro Nunome et al., "The Effect of Audio-Video Multipath Streams on Other Traffic in a Wireless Ad Hoc Network", Technical Report of the IEICE, vol. 104, No. 635, (Jan. 28, 2005), pp. 1-6.
Yasuhiro Yamasaki et al., "A Method of Packet Loss Rate Estimation from Packet Sampling", Technical Report of the IEICE, vol. 104, No. 436, (Nov. 19, 2004), pp. 25-30.
Yasuhiro Yamasaki et al., "Evaluation of UDP/RTP Stream Measurement from Sampled Packets", Technical Report of the IEICE, vol. 105, No. 668, (Mar. 16-17, 2006), pp. 37-42.

* cited by examiner

*Primary Examiner* — Derrick W Ferris
*Assistant Examiner* — Mohammad Anwar

(57) ABSTRACT

An inversion of a packet transmission sequence number is observed in a predetermined sampling measurement. The number of sampled sequence numbers greater than the sequence number upon the inversion is measured as an inversion degree. A number of packet losses or a loss ratio is estimated according to the inversion degree under the estimated full sampling measurement and the inversion degree observed under a predetermined sampling measurement.

16 Claims, 8 Drawing Sheets

ESTIMATION METHOD, DEVICE, AND PROGRAM, AND NETWORK MEASURING SYSTEM

This application is the National phase of PCT/JP2007/063450, filed Jul. 5, 2007, which claims priority to Japanese Application No. 2006-187821, filed Jul. 7, 2006.

TECHNICAL FIELD

The present invention relates to a technique for measuring quality of a network, and particularly, to an estimating method, apparatus and program, and a network measuring system for estimating the loss count or loss rate for transmitted packets under a predetermined sampling measurement.

BACKGROUND ART

A conventional technique for detecting end-to-end packet losses is disclosed in Non-patent Document 1. The technique disposes a capturing section on a path between a terminal A and a terminal B, and the capturing section fully captures packets passing therethrough. The technique involves checking sequence numbers of the packets, and detecting a packet loss when the order of the transmission sequence number is inverted.

Non-patent Document 1: Tomohiko OHGISHI, Akira IDOUE, Toru HASEGAWA, Toshihiko KATO, "Design of Performance Monitor for Collecting Statistical Information at TCP Level from One-directional IP Traffic," 2000 Proceedings of IEICE, B-7-3

DISCLOSURE OF THE INVENTION

Problems to be Solved by the Invention

In the aforementioned conventional technique, quality measurement, i.e., detection of packet losses, can be achieved with high precision only when all transmitted packets are acquired.

In a high-speed region of a communication network, however, unsuccessful pickup of packets is often encountered, or otherwise, acquisition of all packets requires high processing capability in a CPU, a network, a bus band or the like requisite in a measuring instrument.

The present invention has been made in light of such a problem, and its object is to provide a packet loss rate estimating method, apparatus and program, and a network measuring system capable of estimating losses of transmitted packets or packet loss rate without acquiring all transmitted packets.

Means to Solve the Problem

The present invention for solving the above-mentioned problems, which is an estimating method of estimating a packet loss count or loss rate, characterized in that the method comprises: observing an inversion of a packet transmission sequence number under a predetermined sampling measurement, and measuring a count of sampled sequence numbers equal to or greater than the sequence number upon said inversion as a degree of inversion; and estimating a packet loss count or loss rate from an estimated degree of inversion under a full sampling measurement and a degree of inversion that can be observed under the predetermined sampling measurement.

The present invention for solving the above-mentioned problems, which is an estimating method of estimating a packet loss count or loss rate, characterized in that the method comprises: measurement processing for observing an inversion of a packet transmission sequence number under a predetermined sampling measurement, and measuring a count of sampled sequence numbers equal to or greater than the sequence number upon said inversion as a degree of inversion; and estimation processing for obtaining a probability of observation of the degree of inversion that can be observed under said predetermined sampling measurement from a ratio of a count of the degrees of inversion that can be observed under said predetermined sampling measurement relative to a whole count of the degrees of inversion that can be observed under a full sampling measurement, and estimating a packet loss count or loss rate based on said probability of observation.

The present invention for solving the above-mentioned problems, which is an estimating method of estimating a packet loss count or loss rate, characterized in that the method comprises: measurement processing for observing an inversion of a packet transmission sequence number under a predetermined sampling measurement, and measuring a count of sampled sequence numbers equal to or greater than the sequence number upon said inversion as a degree of inversion; and estimation processing for retrieving, from a database in which at least a packet loss rate and a probability of observation are correspondingly stored, a probability of observation corresponding to said packet loss rate, calculating again a packet loss count and a packet loss probability from said probability of observation, and estimating a packet loss count or a packet loss probability.

The present invention for solving the above-mentioned problems, which is an estimating apparatus for estimating a packet loss count or loss rate, characterized in that the apparatus comprises: means for observing an inversion of a packet transmission sequence number under a predetermined sampling measurement, and measuring a count of sampled sequence numbers equal to or greater than the sequence number upon said inversion as a degree of inversion; and means for estimating a packet loss count or loss rate from an estimated degree of inversion under a full sampling measurement and a degree of inversion that can be observed under the predetermined sampling measurement.

The present invention for solving the above-mentioned problems, which is an estimating apparatus for estimating a packet loss count or loss rate, characterized in that the apparatus comprises: measurement means for observing an inversion of a packet transmission sequence number under a predetermined sampling measurement, and measuring a count of sampled sequence numbers equal to or greater than the sequence number upon said inversion as a degree of inversion; and estimation means for obtaining a probability of observation of the degree of inversion that can be observed under said predetermined sampling measurement from a ratio of a count of the degrees of inversion that can be observed under said predetermined sampling measurement relative to a whole count of the degrees of inversion that can be observed under a full sampling measurement, and estimating a packet loss count or loss rate based on said probability of observation.

The present invention for solving the above-mentioned problems, which is an estimating apparatus for estimating a packet loss count or loss rate, characterized in that the apparatus comprises: measurement means for observing an inversion of a packet transmission sequence number under a predetermined sampling measurement, and measuring a count of sampled sequence numbers equal to or greater than the sequence number upon said inversion as a degree of inversion; and estimation means for retrieving, from a database in which at least a packet loss rate and a probability of observation are correspondingly stored, a probability of observation corresponding to said packet loss rate, calculating again a packet loss count and a packet loss probability from said probability of observation, and estimating a packet loss count or a packet loss probability.

The present invention for solving the above-mentioned problems, which is a network measuring system for estimating packet losses or a packet loss rate, characterized in that the system comprises: means for observing an inversion of a packet transmission sequence number under a predetermined sampling measurement, and measuring a count of sampled sequence numbers equal to or greater than the sequence number upon said inversion as a degree of inversion; and means for estimating a packet loss count or loss rate from an estimated degree of inversion under a full sampling measurement and a degree of inversion that can be observed under the predetermined sampling measurement.

The present invention for solving the above-mentioned problems, which is a network measuring system for estimating a packet loss count or loss rate, characterized in that the system comprises: measurement means for observing an inversion of a packet transmission sequence number under a predetermined sampling measurement, and measuring a count of sampled sequence numbers equal to or greater than the sequence number upon said inversion as a degree of inversion; and estimation means for obtaining a probability of observation of the degree of inversion that can be observed under said predetermined sampling measurement from a ratio of a count of the degrees of inversion that can be observed under said predetermined sampling measurement relative to a whole count of the degrees of inversion that can be observed under a full sampling measurement, and estimating a packet loss count or loss rate based on said probability of observation.

The present invention for solving the above-mentioned problems, which is a network measuring system for estimating a packet loss count or loss rate, characterized in that the system comprises: measurement means for observing an inversion of a packet transmission sequence number under a predetermined sampling measurement, and measuring a count of sampled sequence numbers equal to or greater than the sequence number upon said inversion as a degree of inversion; and estimation means for retrieving, from a database in which at least a packet loss rate and a probability of observation are correspondingly stored, a probability of observation corresponding to said packet loss rate, calculating again a packet loss count and a packet loss probability from said probability of observation, and estimating a packet loss count or a packet loss probability.

The present invention for solving the above-mentioned problems, which is an estimating program for estimating a packet loss count or loss rate, characterized in that the program causes an information processing apparatus to execute processing of: observing an inversion of a packet transmission sequence number under a predetermined sampling measurement, and measuring a count of sampled sequence numbers equal to or greater than the sequence number upon said inversion as a degree of inversion; and estimating a packet loss count or loss rate from an estimated degree of inversion under a full sampling measurement and a degree of inversion that can be observed under the predetermined sampling measurement.

The present invention for solving the above-mentioned problems, which is an estimating program for estimating a packet loss count or loss rate, characterized in that the program causes an information processing apparatus to execute: measurement processing for observing an inversion of a packet transmission sequence number under a predetermined sampling measurement, and measuring a count of sampled sequence numbers equal to or greater than the sequence number upon said inversion as a degree of inversion; and estimation processing for obtaining a probability of observation of the degree of inversion that can be observed under said predetermined sampling measurement from a ratio of a count of the degrees of inversion that can be observed under said predetermined sampling measurement relative to a whole count of the degrees of inversion that can be observed under a full sampling measurement, and estimating a packet loss count or loss rate based on said probability of observation.

The present invention for solving the above-mentioned problems, which is an estimating program for estimating a packet loss count or loss rate, characterized in that the program causes an information processing apparatus to execute: measurement processing for observing an inversion of a packet transmission sequence number under a predetermined sampling measurement, and measuring a count of sampled sequence numbers equal to or greater than the sequence number upon said inversion as a degree of inversion; and estimation processing for retrieving, from a database in which at least a packet loss rate and a probability of observation are correspondingly stored, a probability of observation corresponding to said packet loss rate, calculating again a packet loss count and a packet loss probability from said probability of observation, and estimating a packet loss count or a packet loss probability.

The present invention for solving the above-mentioned problems, which is an estimating method of estimating a packet loss count or loss rate, characterized in that the method comprises: measurement processing for measuring a number of times of an inversion of a packet transmission sequence number under a predetermined sampling measurement; and estimation processing for obtaining a probability of observation of the number of times of the inversion that can be observed under said predetermined sampling measurement from a ratio of a number of times of the inversion that can be observed under said predetermined sampling measurement relative to the number of times of the inversion that can be observed under a full sampling measurement, and estimating a packet loss count or loss rate based on said probability of observation.

The present invention for solving the above-mentioned problems, which is an estimating apparatus for estimating a packet loss count or loss rate, characterized in that the apparatus comprises: measurement means for measuring a number of times of an inversion of a packet transmission sequence number under a predetermined sampling measurement; and estimation means for obtaining a probability of observation of the number of times of the inversion that can be observed under said predetermined sampling measurement from a ratio of a number of times of the inversion that can be observed under said predetermined sampling measurement relative to the number of times of the inversion that can be observed under a full sampling measurement, and estimating a packet loss count or loss rate based on said probability of observation.

The present invention for solving the above-mentioned problems, which is an estimating program for estimating a packet loss count or loss rate, characterized in that the program causes an information processing apparatus to execute:

measurement processing for measuring a number of times of an inversion of a packet transmission sequence number under a predetermined sampling measurement; and estimation processing for obtaining a probability of observation of the number of times of the inversion that can be observed under said predetermined sampling measurement from a ratio of a number of times of the inversion that can be observed under said predetermined sampling measurement relative to the number of times of the inversion that can be observed under a full sampling measurement, and estimating a packet loss count or loss rate based on said probability of observation.

The present invention for solving the above-mentioned problems, which is an estimating method of estimating a packet loss count or loss rate, characterized in that the method comprises: measurement processing for measuring a number of times of an inversion of a packet transmission sequence number under a predetermined sampling measurement; and estimation processing for, based on said number of times of the inversion, obtaining a probability of observation of the number of times of the inversion that can be observed under said predetermined sampling measurement, and based on said probability of observation, estimating a packet loss count or loss rate.

The present invention for solving the above-mentioned problems, which is an estimating apparatus for estimating a packet loss count or loss rate, characterized in that the apparatus comprises: measurement means for measuring a number of times of an inversion of a packet transmission sequence number under a predetermined sampling measurement; and estimation means for, based on said number of times of the inversion, obtaining a probability of observation of the number of times of the inversion that can be observed under said predetermined sampling measurement, and based on said probability of observation, estimating a packet loss count or loss rate.

The present invention for solving the above-mentioned problems, which is an estimating program for estimating a packet loss count or loss rate, characterized in that the program causes an information processing apparatus to execute: measurement processing for measuring a number of times of an inversion of a packet transmission sequence number under a predetermined sampling measurement; and estimation processing for, based on said number of times of the inversion, obtaining a probability of observation of the number of times of the inversion that can be observed under said predetermined sampling measurement, and based on said probability of observation, estimating a packet loss count or loss rate.

Effects of the Invention

According to the present invention, packet losses or packet loss rate can be estimated with high precision without requiring high processing capability of a measurement instrument.

EXPLANATION OF SYMBOLS

Figure 1:
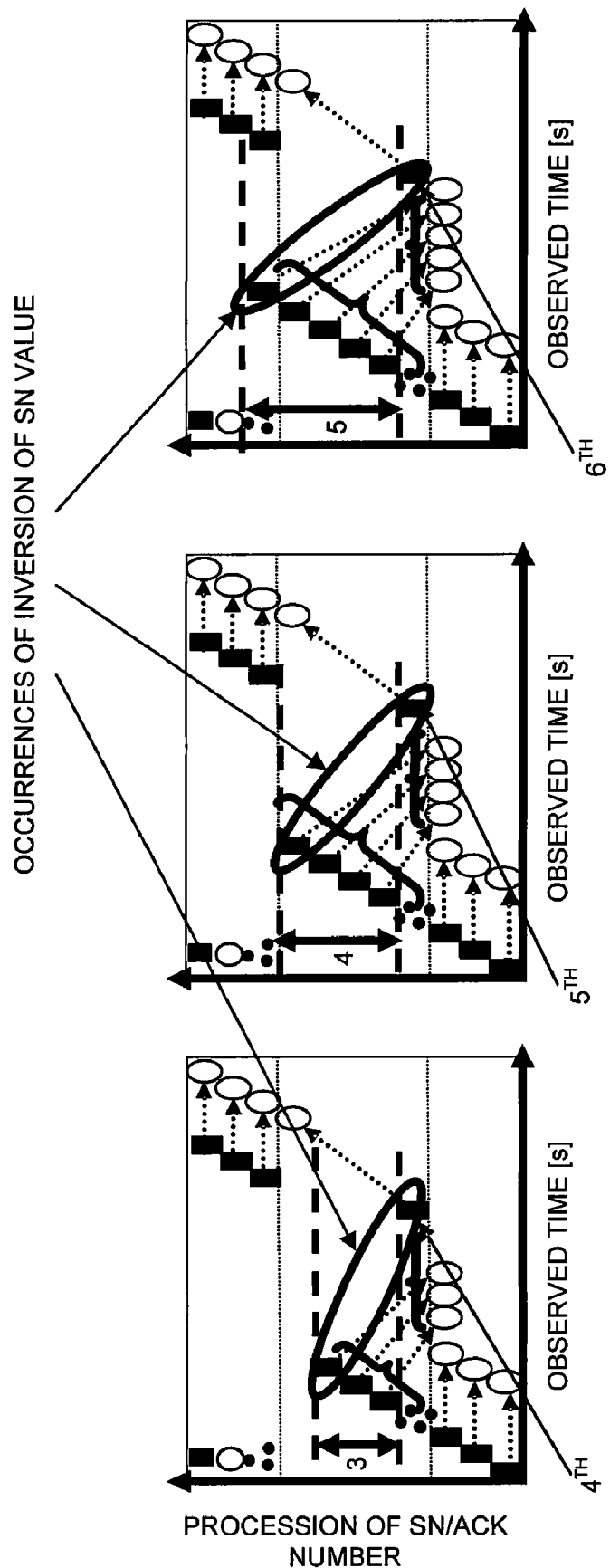
FIG. 1 is a diagram for explaining the degree of inversion.

1 Measuring apparatus
2, 3 Communication terminal
4, 5 Branching device

BEST MODES FOR CARRYING OUT THE INVENTION

An embodiment of the present invention will now be described.

First, a concept of the present invention will be discussed below.

The present invention is characterized in that it observes an occurrence of an inversion of the packet transmission sequence number (which will be designated as SN hereinbelow) under a predetermined sampling measurement, and based on the result of the observation, estimates the actual packet loss count or loss rate that would otherwise be observed under a full sampling measurement. As used herein, the packet loss rate refers to a ratio of the number of packets among transmitted packets that have disappeared (lost) on the way of communication due to line error or the like; for example, if the number of transmitted packets is N, and the number of lost packets is M, the packet loss rate is M/N.

As used herein, an occurrence of an inversion of SN refers to a phenomenon that the observed packet sequence number does not follow an ascending order and it decreases due to packet retransmission or the like. For example, this refers to a case that the packet sequence number has followed an ascending order like 4, 5, 6, . . . , but a next observed packet sequence number is not 7 but 3.

The present invention employs a concept of a degree of inversion in order to observe such an occurrence of an inversion of SN. FIG. 1 is a diagram for explaining the degree of inversion. As used herein, the degree of inversion refers to a count of the SN values taken upon an occurrence of an inversion of the SN value, representing how many SN values that are equal to or greater than the SN value upon the inversion have been observed until the inversion. For example, in the condition of FIG. 1A in FIG. 1, the degree of inversion is four; in the condition of FIG. 1B, it is five; and in the condition of FIG. 1C, it is six.

When the occurrence of an inversion of SN is observed under a predetermined sampling measurement using such a degree of inversion, for example, when the degree of inversion is five at an occurrence of an inversion of SN under a sampling probability of 0.5, then, the degree of inversion is predicted to be 10 if the degree of inversion was measured under a sampling probability of one, i.e., under a full sampling (full capture). The reason of this is that: when the number of packets sampled (captured) under a sampling probability of 0.5 is five, the number of packets under the full sampling (full capture) is predicted to be ten. As used herein, the sampling probability refers to a probability when packets are sampled in a ratio of one packet for every N transmitted packets.

However, when observation is made under the predetermined sampling measurement, there may be some occurrences of an inversion that cannot be observed and a result somewhat different from the aforementioned one may be given; therefore, a statistical technique is used to perform prediction.

Figure 2:
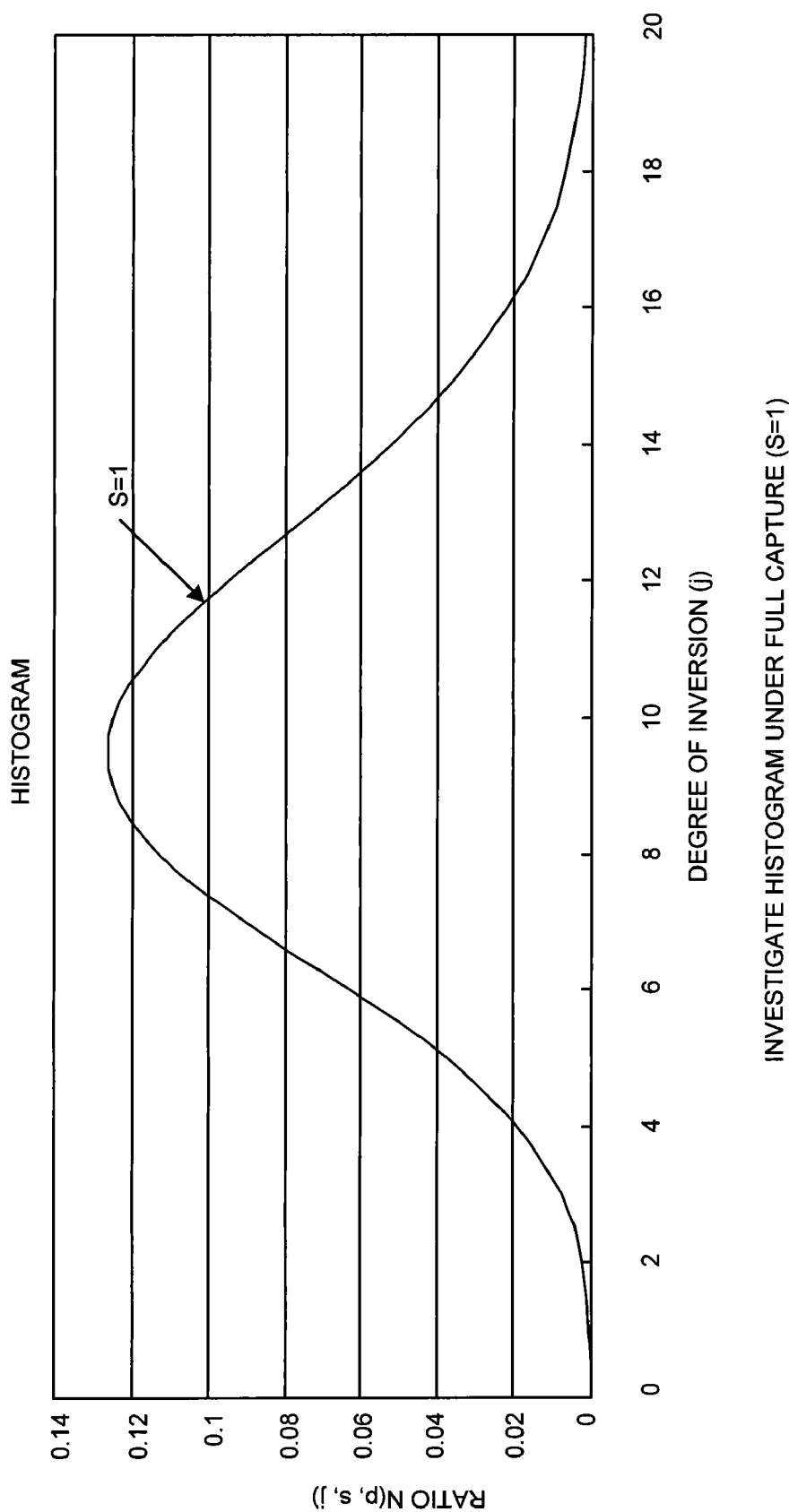
FIG. 2 is a diagram for explaining a concept of estimating the count of occurrences of inversion of the SN value using a statistical technique.
Figure 3:
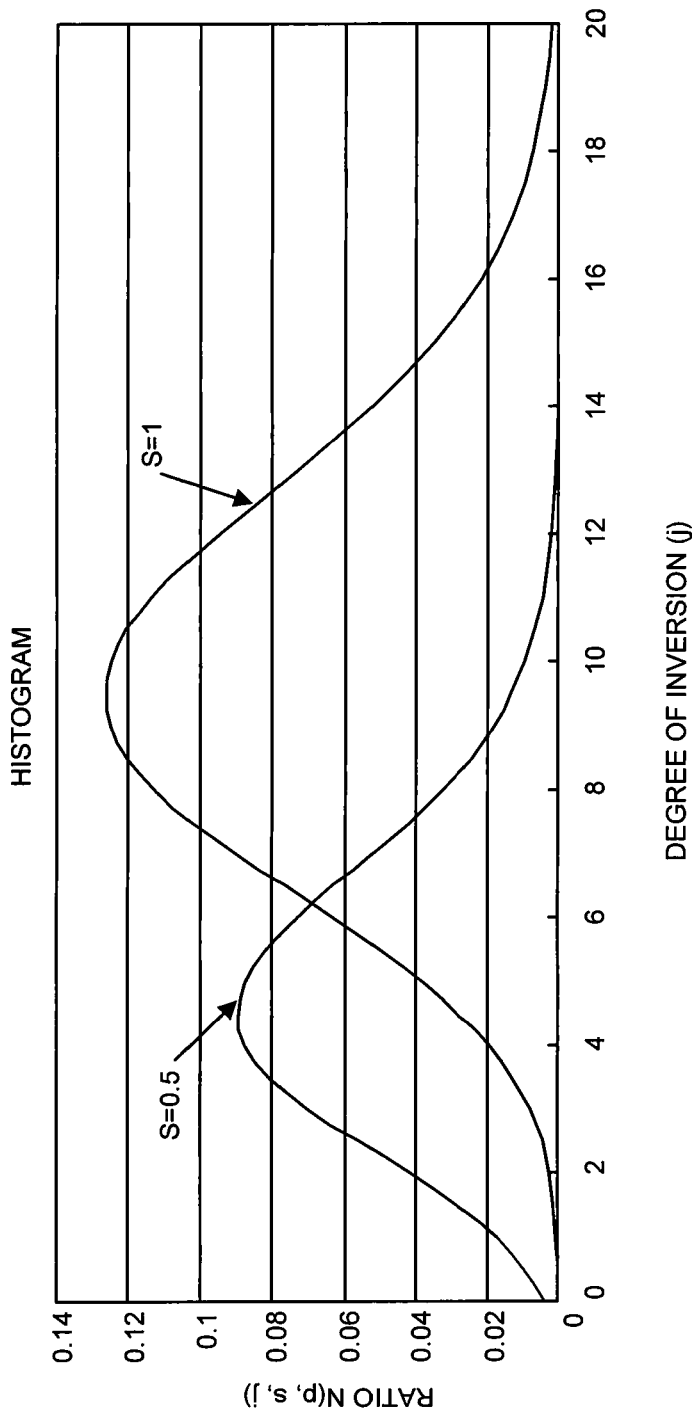
FIG. 3 is a diagram for explaining a concept of estimating the count of occurrences of an inversion of the SN value using a statistical technique.
Figure 4:
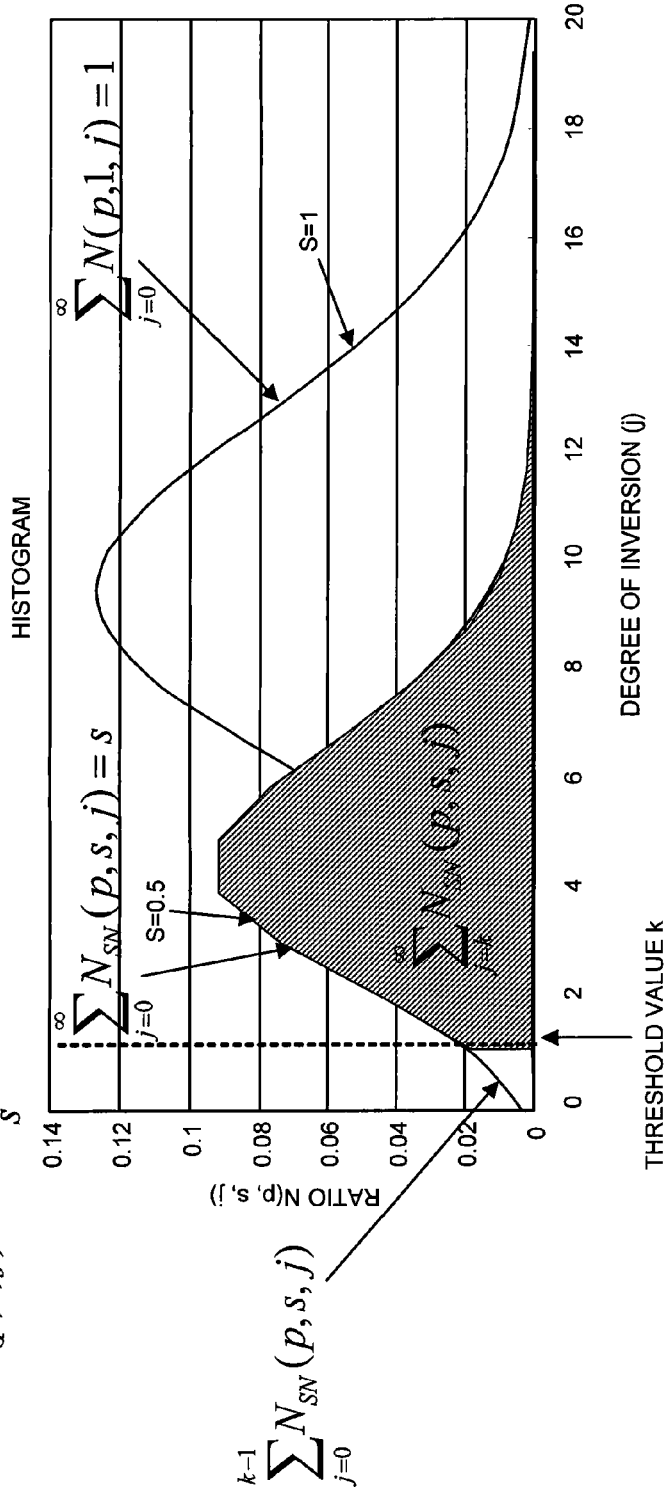
FIG. 4 is a diagram for explaining a concept of estimating the count of occurrences of an inversion of the SN value using a statistical technique.

FIG. 2 to FIG. 4 are diagrams for explaining a concept of estimating the count of occurrences of an inversion of the SN value using a statistical technique.

First, as shown in FIG. 2, a histogram under a full sampling (full capture) is predicted with the degree of inversion j defined along a horizontal axis and a ratio N of the count of a certain degree of inversion to the total count of the degrees of inversion defined along a vertical axis. The histogram may be obtained statistically or measured. It should be noted that the ratio N can be defined as a function of the variables: a packet loss rate p, a sampling probability s, and a degree of inversion j.

Next, as shown in FIG. 3, a histogram observed under a predetermined sampling probability s is predicted. The total of the ratios $N(p, 1, j)$ under a sampling probability of one is given by EQ. 1, and the total of the ratios $N_{SN}(p, s, j)$ under a sampling probability of s is given by EQ. 2 below:

$$\sum_{j=0}^{\infty} N(p, 1, j) = 1 \quad \text{EQ. 1}$$

$$\sum_{j=0}^{\infty} N_{SN}(p, s, j) = s \quad \text{EQ. 2}$$

Although a histogram shown in FIG. 4 is a predicted one for a sampling probability of s, j equal to or smaller than zero cannot be observed because sampling measurement is made. For example, in a case that SN's of sampled packets are 5, 6, 4, then, an occurrence of an inversion of SN can be observed; however, even if an inversion of SN has occurred, it cannot be observed unless SN's of packets immediately before or after the inversion of SN are sampled.

Accordingly, the degree of inversion is measured with a threshold value j=1 or higher. Specifically, the threshold value is a value that determines a value of the degree of inversion to be measured; for example, a threshold value k=1 means that a degree of inversion of one or higher is measured, and a threshold value k=2 means that a degree of inversion of two or higher is measured; in ordinary cases, k=1. This means that the total of the ratios $N(p, s, j)$ under a sampling probability s as given by EQ. 2 contains a portion of the threshold value k or lower that cannot be actually observed.

Therefore, a probability of observation, which is a probability that an occurrence of an inversion of the SN value can be observed under a sampling probability s is given by EQ. 3:

$$\text{Probability of observation of } SNQ_{sn}(p, s, k) = \frac{\sum_{j=k}^{\infty} N_{sn}(p, s, j)}{\sum_{j=0}^{\infty} N(p, 1, j)} = \quad \text{EQ. 3}$$

$$\frac{\sum_{j=0}^{\infty} N_{sn}(p, s, j) - \sum_{j=0}^{k-1} N_{sn}(p, s, j)}{1} = s - \sum_{j=0}^{k-1} N_{sn}(p, s, j) =$$

$$s - s\sum_{j=0}^{k-1} N(p, s, j) = s\left\{1 - \sum_{j=0}^{k-1} N(p, s, j)\right\}$$

The probability of observation is also a ratio of the events of degrees of inversion (a portion of a hatched area of s=0.5) observed relative to the actual occurrences of an inversion (the histogram of s=1). By obtaining the probability of observation, the degree of inversion of the SN value or packet loss rate including the occurrences of an inversion of a threshold value of k or lower that cannot be observed can be obtained.

Now a particular method of calculation will be discussed below.

Step 1

First, the degree of inversion of the SN value is observed under a predetermined sampling measurement. A count value (observed) for a threshold value of k is designated as $A_k$. In ordinary cases, k=1, where the count value is equal to the number of times of an inversion of the SN value, i.e., the packet loss count (the count of occurrences of an inversion of the SN value); therefore, the number of times of an inversion of the SN value may be counted.

Step 2

Subsequently, the packet loss count (the count of occurrences of an inversion of the SN value) is defined as $X_i$ (a provisional estimated value before convergence), and the packet loss rate is defined as $p_{i+1} = X_{i+1}/Th$, where Th is the traffic (the number or size of packets) occurring in a period of time to be measured. Then, an arbitrary initial value $X_0$ (>0) of the packet loss count is selected, which value is converted into an initial value of the packet loss rate $p_0$. The initial value of the packet loss rate $p_0$ is $p_0 = X_0/Th$. It should be noted that a recommended value for the initial value $X_0$ is a packet loss count $A_k$ in an immediately preceding period of time, for example.

Step 3

Next, a probability of observation $Q_{SN}(p_i, s, k)$ is obtained from the value of $p_i$. It should be noted that s is a sampling probability under the predetermined sampling measurement, and the probability of observation $Q_{SN}(p_i, s, k) \neq$ the sampling probability s. A probability of observation $Q_{SN}(p_i, s, k)$ when the SN value is observed is given by EQ. 4:

$$\text{Probability of observation of } SNQ_{SN}(p, s, k) = \quad \text{EQ. 4}$$

$$s \times \left\{1 - \sum_{j=0}^{k-1} N(p, s, j)\right\}$$

where the value that k can take is one or greater, and j refers to a degree of inversion. When k is defined as one, the probability of observation $Q_{SN}(p_i, s, k)$ is given by:

Probability of observation of SN $Q_{SN}(p,s,1) = s \times \{1 - N(p,s,0)\}$

In this equation, the ratio $N(p, s, j)$ under a sampling probability s is defined as a function of variables p, s, j, and it is possible to determine, based on a probability distribution model, the function N on the basis of a Poisson distribution. In this case, $N(p, s, j)$ is given by EQ. 5:

$$N(p_i, s, j) = \frac{\left(s\sqrt{\frac{8}{3bp_i}}\right)^j}{j!} e^{-\left(s\sqrt{\frac{8}{3bp_i}}\right)} \qquad \text{EQ. 5}$$

where b is a constant.

It should be noted that the distribution of N(p, s, j) is not limited to that represented by EQ. 5 and may follow other formulae.

After the function N(p, s, k) has thus been defined, a probability of observation $Q_{SN}(p_i, s, k)$ is obtained.

Step 4

Moreover, from the observed value $A_k$ and probability of observation $Q_{SN}(p_i, s, k)$, $X_{i+1}$ (packet loss count) is estimated based on EQ. 6, and is converted into the packet loss rate based on EQ. 7:

$$X_{i+1} = A_k / Q_{SN}(p_i, s, k) \qquad \text{EQ. 6}$$

$$p_{i+1} = X_{i+1}/Th \qquad \text{EQ. 7}$$

Step 5

The calculations at Steps 3 and 4 described above are repeated. Although a true packet loss count is ideally $X_\infty$, in practice, the repetitive calculation is made until a rate of change = $\{(X_{i+1}-X_i)/X_i\}$ or $\{(p_{i+1}-p_i)/p_i\}$ falls within a certain range or until i reaches a certain value.

In this way, the packet loss rate $P_{i+1}$ and packet loss count $X_{i+1}$ are obtained.

While the method of calculation is described as one for obtaining the packet loss rate $p_{i+1}$ and packet loss count $X_{i+1}$ using a statistical technique, it may be implemented as a technique of constructing a database based on a distribution of results of experiments and determining the function N from the results.

Now the method of constructing a database will be discussed below.

Figure 5:
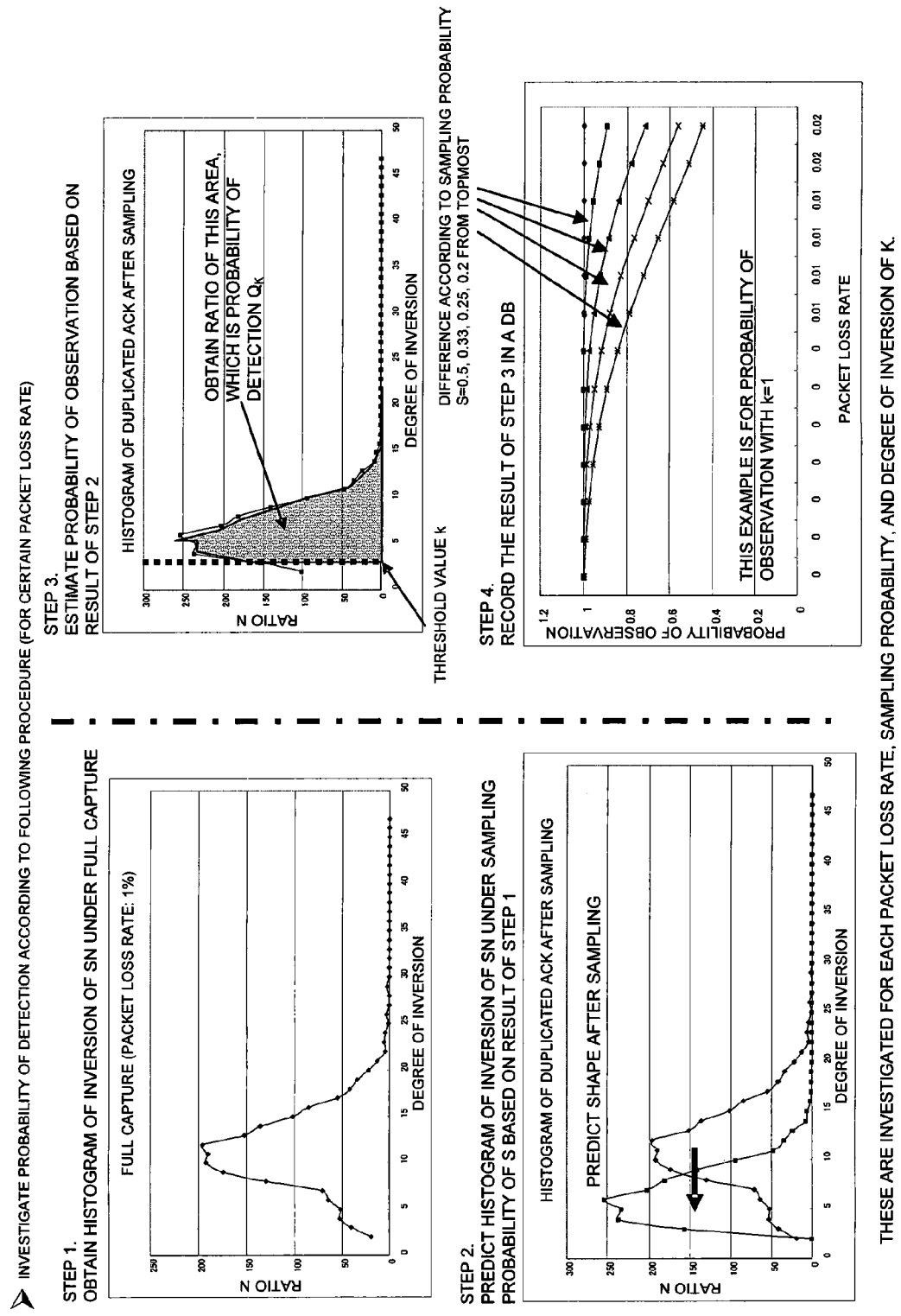
FIG. 5 is a diagram for explaining a method of constructing a database.

First, as shown in Step 1 in FIG. 5, a histogram of occurrences of an inversion of the SN value is created under a sampling probability $s_0$ (=1), i.e., a full sampling measurement, with the degree of inversion under the sampling probability s defined along a horizontal axis and the ratio N(p, s, j) under the sampling probability s defined along a vertical axis as shown in FIG. 5, the histogram being created for each of a plurality of certain packet loss rates, for example, a packet loss rate from about 0.001% (minimum) to about 10% (maximum).

Next, as shown in Step 2 in FIG. 5, based on the created histogram (sampling probability $s_0$=1), a histogram for a certain sampling probability s is predicted. In the histogram N(p, s, j) for a sampling probability s, N(p, 1, j) is known because of a full sampling and is given as EQ. 8:

$$N(p, s, j) = \sum_{i=1}^{1/s-1} s \times i \times N(p, 1, (j-1)/s + i) + \qquad \text{EQ. 8}$$

$$N(p, 1, j/s) + \sum_{i=1}^{1/s-1} (1 - s \times i) \times N(p, 1, j/s + i)$$

where p designates a packet loss rate, s designates a sampling probability, and j designates a degree of inversion of the SN value.

Figure 6:
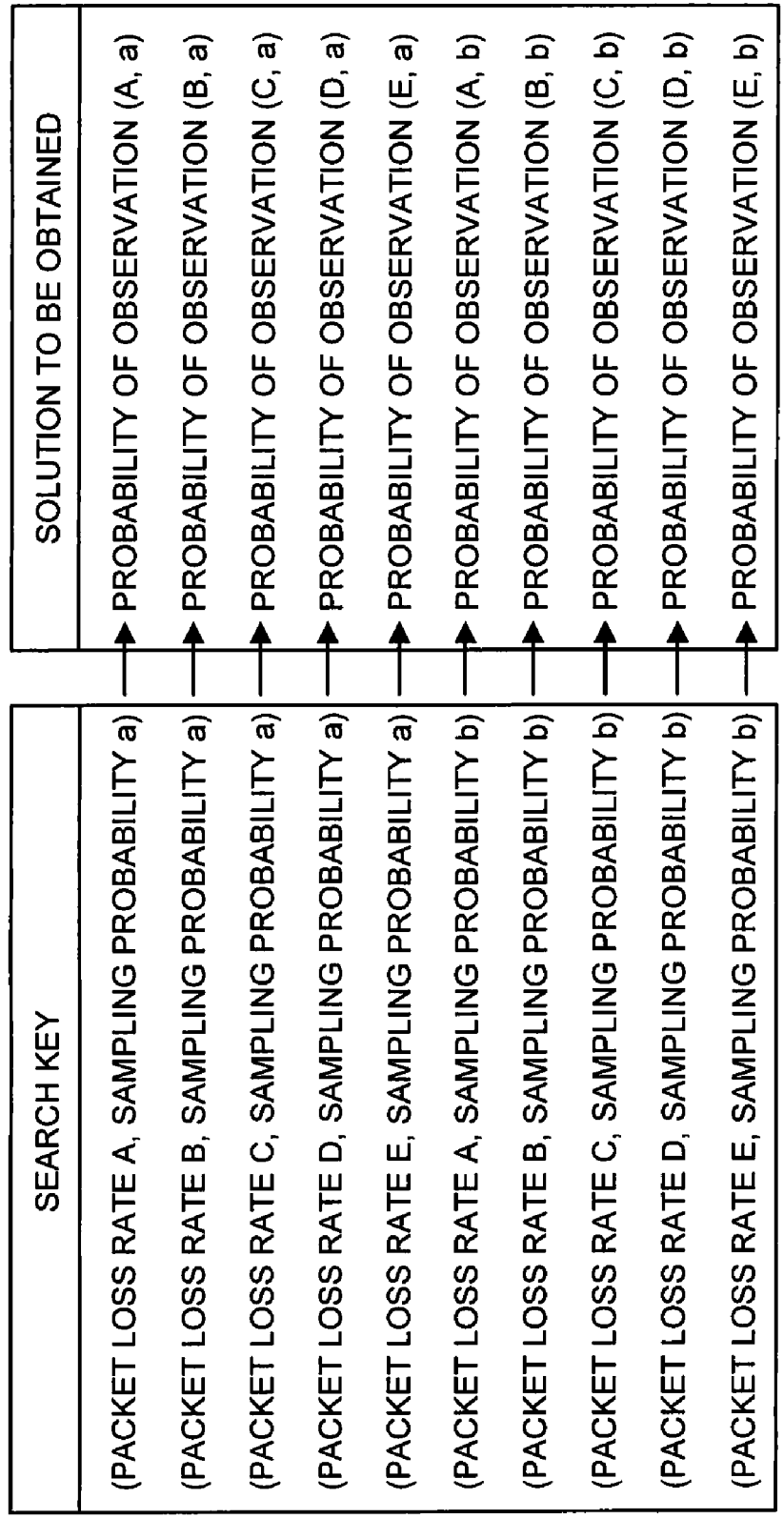
FIG. 6 is a diagram showing an example of the database shown.

The thus-obtained histograms N(p, s, j) for sampling probabilities s are assigned to EQ. 4 to obtain a probability of observation for each of the sampling probability s, as shown in Step 3 in FIG. 5. Since the obtained probability of observation is discrete, linear interpolation or logarithmic interpolation is applied to obtain a continuous value, and the resulting probability of observation is recorded into a database as shown in Step 4 in FIG. 5. FIG. 6 shows an example of such a database.

In the database shown in FIG. 6, a search key is a combination of the packet loss rate and sampling probability, and such combinations and their respective probabilities of observation are correspondingly stored.

While in the preceding description, the database is created based on the histogram obtained under a full sampling measurement, it is not necessarily created based on such a histogram obtained under the full sampling measurement. For example, the database may be created based on a histogram obtained under sampling measurement with a sampling probability of about 0.9, although at the cost of somewhat reduced precision.

Then, a probability of observation corresponding to a combination of a packet loss rate and a sampling probability at that rate obtained by EQ. 7 is retrieved from the database, and the retrieved probability of observation is again assigned to EQ. 6 to thereby achieve the aforementioned processing of Step 4.

Such processing enables a packet loss rate $P_{i+1}$ and a packet loss count $X_{i+1}$ to be obtained similarly to the aforementioned statistical technique.

Although the present invention is described hereinabove while incorporating therein a concept of the degree of inversion, the present invention is not limited thereto. For example, assuming that the distribution of the degree of inversion is similar to a distribution of a congestion window, the present invention may be contemplated as one that estimates the packet loss count or packet loss rate by predicting the size of the congestion window at a transmitting terminal from the number of times of an inversion observed under sampling measurement.

Alternatively, assuming that the distribution of the degree of inversion is similar to a distribution of duplicated ACK's, the present invention may be contemplated as one that estimates the packet loss count or loss count by predicting the number of duplicated ACK's that have occurred from the number of times of an inversion observed under sampling measurement.

However, when k is defined as one and the number of times of an inversion of the SN value is counted, the packet loss count or loss count can be estimated according to the formulae described above without especially taking account of the degree of inversion j or the aforementioned congestion window or duplicated ACK's.

Next, an embodiment in which the present invention is applied to a particular system will be discussed below.

Figure 7:
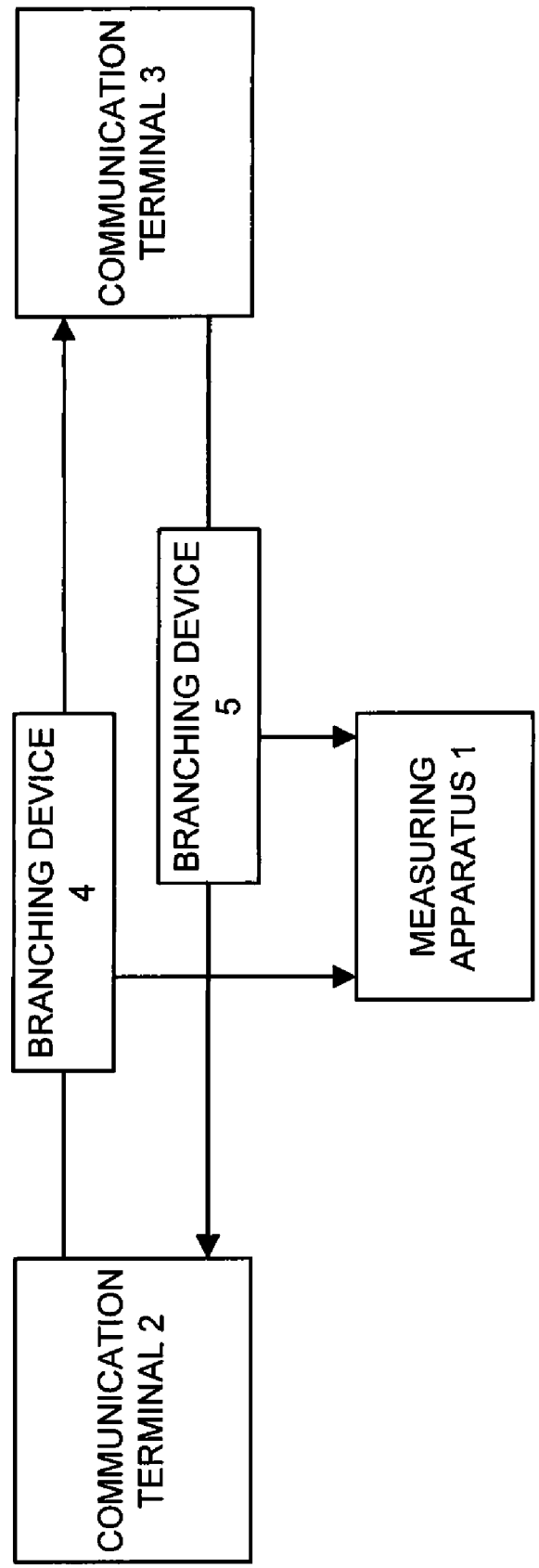
FIG. 7 is a diagram showing an overview of a network to which the present invention is applied.

FIG. 7 is a diagram showing an overview of a network to which the present invention is applied.

In FIG. 7, reference numeral 1 designates a measuring apparatus for measuring the packet loss rate, reference numerals 2, 3 designate communication terminals, and reference numerals 4, 5 designate branching devices.

Figure 8:
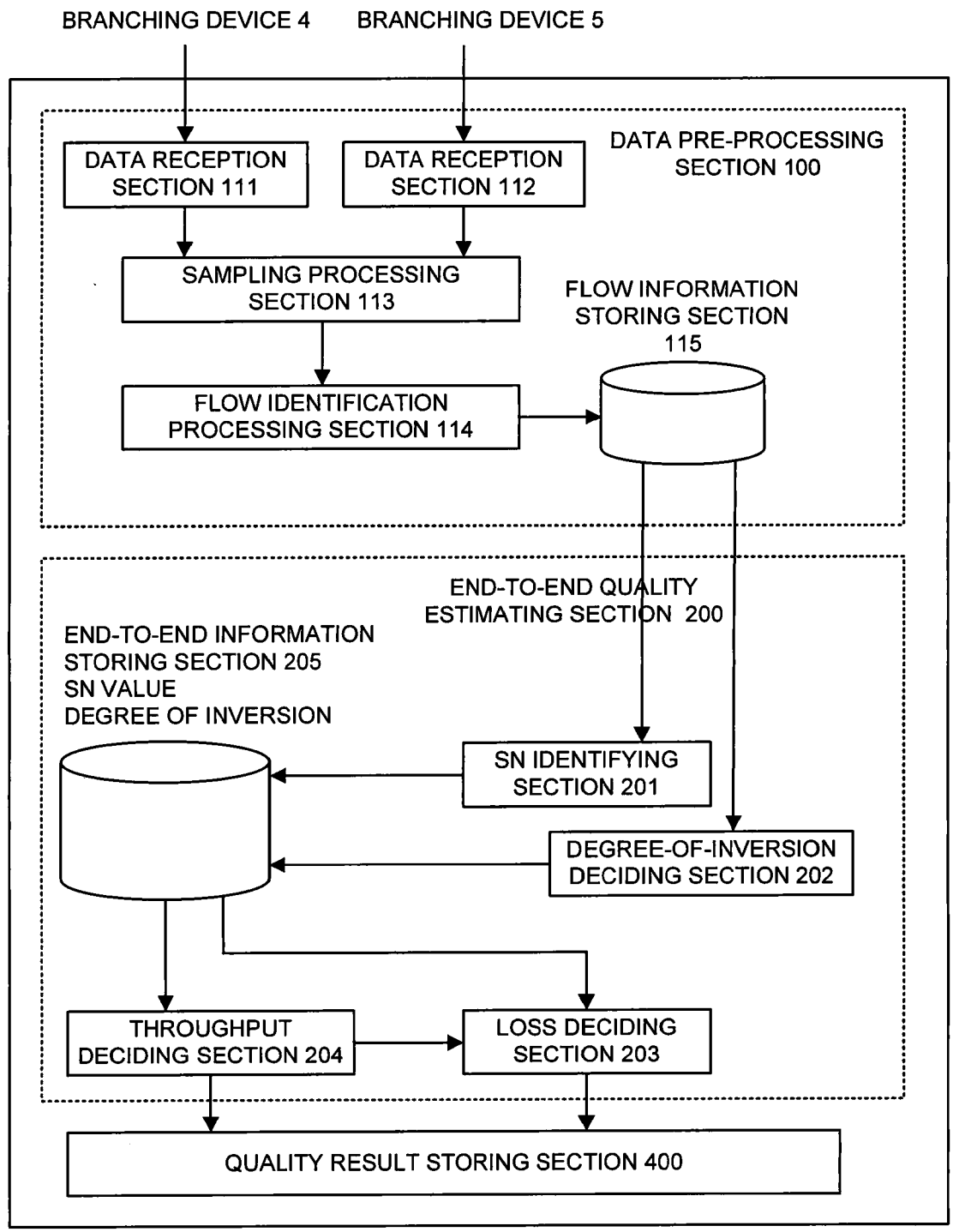
FIG. 8 is a block diagram showing a configuration of a measuring apparatus 1.

FIG. 8 is a block diagram showing a configuration of the measuring apparatus 1.

The measuring apparatus 1 has a data pre-processing section 100 comprising data reception sections 111 and 112 for receiving data input from the branching devices 4, 5, a sampling processing section 113 for acquiring packet information from packets input at the data reception sections 111, 112 in a probability of one packet per N packets (sampling probability s=1/N), a flow identifying section 114 for flow distribution using information in the acquired packets, and a flow information storing section 115 for storing the result of the flow distribution.

The measuring apparatus 1 also has an end-to-end quality estimating section 200 comprising an end-to-end information storing section 205, an SN identifying section 201 for extracting information from the flow information storing section 115, identifying a sequence number (SN) therein, and storing it into the end-to-end information storing section 205, a degree-of-SN-inversion deciding section 202 for extracting information from the end-to-end information storing section 205, detecting an occurrence of an SN decrease, detecting the number of the occurrences and the degree of inversion, and storing them into the end-to-end information storing section 205, a throughput deciding section 204 for extracting information from the end-to-end information storing section 205 and calculating a throughput, and an end-to-end loss deciding section 203 for deciding the end-to-end loss count or loss rate from the result from the throughput deciding section 204 and the information stored in the end-to-end information storing section 205.

The measuring apparatus 1 additionally has a quality result storing section 400 for storing therein the results from the throughput deciding section 204 and end-to-end loss deciding section 203.

In the present embodiment, processing is started by first taking in packets traveling through a network by the measuring apparatus 1 and passing them to the data pre-processing section 100. Data supplied by the branching device 4 is received at the data reception section 111, and that supplied by the branching device 5 is received at the data reception section 112. After receiving data at the data reception sections 111 and 112, they pass the data to the sampling processing section 113.

The sampling processing section 113 acquires packet information in a probability of one per N packets. Sampling processing methods that may be contemplated here include: a method of random sampling comprising generating a random number, comparing the number with a sampling probability s (1/N), and deciding whether a packet is to be taken or not according to the result of the comparison of the numbers; a method of uniform sampling comprising keeping one counter for the whole packets, for each protocol, or for each flow, comparing the counter value with a sampling probability to decide whether a packet is to be taken or not; and a method comprising comparing part of packet header information such as the sequence number, acknowledge response signal number or the like with the sampling probability.

After the sampling processing section 113 has decided a packet to be taken, the flow identifying processing section 114 uses part of information on the taken packet such as information on at least one of the IP address, port number, protocol ID, VLAN information, and MPLS information, to distribute the packet (flow identification), and stores the result into the flow information storing section 115.

While the data pre-processing section 100 here first performs processing at the sampling processing section 113 and then processing at the flow identifying processing section 114, it may first perform flow identification at the flow identifying processing section 114 and then decide a packet to be taken at the sampling processing section 113.

Next, the end-to-end quality estimating section 200 will be discussed below.

In the present embodiment, the end-to-end quality estimating section 200 performs end-to-end communication quality analysis within a specified time range or at certain regular intervals.

The SN identifying section 201 picks up a data-side packet to be subjected to quality analysis (i.e., a packet corresponding to a specified flow in a specified period of time) from the flow information storing section 115 in sequence, and identifies its SN. The SN is sequentially compared to find out a minimum SN and a maximum SN, and the result is recorded in the end-to-end information storing section 205.

The degree-of-SN-inversion deciding section 202 is set with a threshold value (k) for SN beforehand, and when the currently acquired SN is decreased relative to a preceding number, it takes a count of the SN values taken upon the occurrence of an inversion of the SN value, representing how many SN values that are equal to or greater than the SN value upon the inversion have been observed until the inversion to calculate a degree of inversion. At that time, when the degree of inversion is one, or k=1, the count is incremented, and it is not incremented when k=2.

The throughput deciding section 204 can obtain a traffic or a throughput in the period of time from the information on the difference of the SN value, as given by EQ. 9:

$$\text{Data traffic} = \text{Maximum SN} - \text{Minimum SN}. \quad \text{EQ. 9}$$

When the processing at the SN identification deciding section 201 and that at the degree-of-SN-inversion deciding section 202 have been completed for all packets to be subjected to quality analysis, processing at the throughput deciding section 204 and that at the loss deciding section 203 proceed.

The loss deciding section 203 decides a loss rate according to the aforementioned estimating method.

The results at the loss deciding section 203 and throughput deciding section 204 are stored in the quality result storing section 400.

While in the aforementioned embodiment, the end-to-end quality estimating section 200 is constructed from hardware, the SN identifying section 201, the degree-of-SN-inversion deciding section 202, throughput deciding section 204, and end-to-end loss deciding section 203 may be implemented by a program that causes an information processing apparatus to execute the aforementioned operations.

Embodiment 1

An Embodiment 1 describes a result of an experiment in which TCP transmitted packets were measured over 300 seconds.

In such an environment, 103200 packets traveled and 1055 lost packets were observed under full capture (sampling probability 100% (s=1)) observation, resulting in a packet loss rate of 0.010119. That is, the traffic Th=103200, the packet loss count X=1055, and the packet loss rate p=0.010119.

A run of sampling observation was made in the same environment, with a sampling probability of 10% (s=0.1) and a threshold value k of one.

At that time, the count value (observed) $A_1$ is observed to be 74, and the traffic Th was estimated to be 103198 packets traveled. That is, the count value (observed) $A_1$=74, and the traffic Th=103198.

Based on the result of observation, and according to Step 2 described earlier, the initial value for the packet loss count $X_0$ is defined as 74, and accordingly, the initial value for the packet loss rate is $p_0$=0.000717 from $p_0$=$X_0$/Th.

Therefore, from EQ. 4, EQ. 5 at Step 3 described earlier, $Q_{SN}$(0.000717, 0.1, 1) becomes $Q_{SN}$(0.000717, 0.1, 1)=0.098659. Subsequently, from EQ. 6, EQ. 7 at Step 4 described earlier, $X_1$=750.054, and $p_1$=0.007216.

Next, the calculated $Q_{SN}$ is used to repeat the calculations at Steps 3 and 4 described earlier.

A first repetitive calculation from $X_1$=750.054, $p_1$=0.007216 results in $Q_{SN}$(0.007216, 0.1, 1)=0.7519871, and $X_2$=997.429305 and $p_2$=0.009573.

A second repetitive calculation from $X_2$=997.429305 and $p_2$=0.009573 results in $Q_{SN}$(0.009573, 0.1, 1)=0.931406, and $X_3$=1070.856395 and $p_3$=0.01027.

A third repetitive calculation from $X_3$=1070.856395 and $p_3$=0.01027 results in $Q_{SN}$(0.01027, 0.1, 1)=0.9812956, and $X_4$=1091.267743 and $p_4$=0.010464.

A fourth repetitive calculation from $X_4$=1091.267743 and $p_4$=0.010464 results in $Q_{SN}$(0.010464, 0.1, 1)=0.994917, and $X_5$=1096.842948 and $p_5$=0.010517.

A fifth repetitive calculation from $X_5$=1096.842948 and $p_5$=0.010517 results in $Q_{SN}$(0.010517, 0.1, 1)=0.9986201, and $X_6$=1098.358563 and $p_6$=0.010531.

A sixth repetitive calculation from $X_6$=1098.358563, $p_6$=0.010531 results in $Q_{SN}$(0.010531, 0.1, 1)=0.9996254, and $X_7$=1098.881732 and $p_7$=0.010535.

Thus, convergence was achieved by six repetitive calculations (in the calculation above, the rate of change is defined as 0.001 or lower).

According to the result of the experiment above, if the count of occurrences of an inversion is measured as 74 under 10% sampling, the packet loss count is estimated to be 1098 and the packet loss rate is estimated to be 0.010535. This result indicates that the error rate with respect to the actual packet loss count and packet loss rate actually measured by the full sampling is 5% or lower.

On the other hand, unlike the present invention, if the sampling probability is simply defined to be a probability of observation, the packet loss count is estimated to be 740 (=74/0.1) from {(packet loss count)/(sampling probability)}. However, the packet loss count actually was 1055, and therefore, the error rate is of the order of 30%, which reveals low precision.

Thus, it can be seen that according to the present invention, an actual packet loss count or packet loss rate can be estimated with high precision based on the result of a predetermined sampling measurement.

The present application claims priority based on Japanese Patent Application No. 2006-187821, filed on Jul. 7, 2006, disclosure of which is incorporated herein in its entirety.

The invention claimed is:

1. An estimating method of estimating a packet loss count or loss rate, comprises:

observing processing, by a measuring apparatus installed at a halfway point of a network path between a transmitting apparatus and a receiving apparatus, to observe an inversion of a packet transmission sequence number under a predetermined sampling measurement, and measuring a count of sampled sequence numbers equal to or greater than the sequence number upon said inversion as degrees of inversion; and estimation processing, by the measuring apparatus, to obtain a probability of observation of the degrees of inversion that are observed under said predetermined sampling measurement from a ratio of a count of the degrees of inversion that are observed under said predetermined sampling measurement relative to a whole count of the degrees of inversion that are observed under a full sampling measurement, and to estimate a packet loss count or loss rate based on said probability of observation.

2. An estimating method according to claim 1, wherein said estimation processing repetitively calculates a packet loss count and a packet loss probability from the count of the degrees of inversion that can be observed under said predetermined sampling measurement and said probability of observation, and estimates a packet loss count and a packet loss probability.

3. An estimating method according to claim 1, wherein said estimation processing obtains said probability of observation from an equation:

$$\text{probability of observation } Q_{SN}(p, s, k) = s \times \left\{1 - \sum_{j=0}^{k-1} N(p, s, j)\right\}$$

(where p designates an estimated packet loss rate, s designates a sampling probability of the predetermined sampling, j designates a degree of inversion, and k designates a threshold value).

4. An estimating method according to claim 1, wherein said estimation processing obtains from an equation:

$$N(p_i, s, j) = \frac{\left(s\sqrt{\frac{8}{3bp_i}}\right)^j}{j!} e^{-\left(s\sqrt{\frac{8}{3bp_i}}\right)}$$

(where b is a constant).

5. An estimating method according to claim 1, wherein said estimation processing comprises processing for retrieving, from a database in which at least a packet loss rate and a probability of observation are correspondingly stored, a probability of observation corresponding to said packet loss rate, calculating again a packet loss count and a packet loss probability from said probability of observation, and estimating a packet loss count or a packet loss probability.

6. An estimating method according to claim 5, wherein said estimation processing repetitively calculates a packet loss count and a packet loss probability from a count of the degrees of inversion that can be observed under said predetermined sampling measurement and said probability of observation, and estimates a packet loss count and a packet loss probability.

7. An estimating method according to claim 5, further comprising creating said database by:

observing an inversion of a packet transmission sequence number under a full sampling measurement, measuring a count of sampled sequence numbers equal to or greater than the sequence number upon said inversion as a degree of inversion, and obtaining a distribution of the degree of inversion under the full sampling measurement for each packet loss rate;

based on said distribution of the degree of inversion under the full sampling measurement, estimating a distribution of the degree of inversion that can be observed under a predetermined sampling probability, and obtaining a probability of observation for each packet loss rate under the predetermined sampling probability; and creating the database with at least a packet loss rate and a probability of observation corresponding to each other.

8. An estimating apparatus for estimating a packet loss count or loss rate, comprising:

an observing unit installed at a halfway point of a network path between a transmitting apparatus and a receiving apparatus to observe an inversion of a packet transmission sequence number under a predetermined sampling measurement, and to measure a count of sampled sequence numbers equal to or greater than the sequence number upon said inversion as degrees of inversion; and an estimating unit installed at the halfway point of the network path between the transmitting apparatus and a receiving apparatus to obtain a probability of observation of the degrees of inversion that are observed under said predetermined sampling measurement from a ratio of a count of the degrees of inversion that are observed under said predetermined sampling measurement relative to a whole count of the degrees of inversion that are observed under a full sampling measurement, and to estimate a packet loss count or loss rate based on said probability of observation.

9. An estimating apparatus according to claim 8, wherein said estimating unit is to repetitively calculate a packet loss count and a packet loss probability from the count of the degrees of inversion that can be observed under said predetermined sampling measurement and said probability of observation, and estimates a packet loss count and a packet loss probability.

10. An estimating apparatus according to claim 8, wherein said estimating unit is to obtain said probability of observation from an equation:

$$\text{probability of observation } Q_{SN}(p, s, k) = s \times \left\{ 1 - \sum_{j=0}^{k-1} N(p, s, j) \right\}$$

(where p designates an estimated packet loss rate, s designates a sampling probability of the predetermined sampling, j designates a degree of inversion, and k designates a threshold value).

11. An estimating apparatus according to claim 8, wherein said estimating unit is to obtain from an equation:

$$N(p_i, s, j) = \frac{\left( s \sqrt{\frac{8}{3bp_i}} \right)^j}{j!} e^{-\left( s \sqrt{\frac{8}{3bp_i}} \right)}$$

(where b is a constant).

12. An estimating apparatus according to claim 8, wherein said estimating unit is to retrieve, from a database in which at least a packet loss rate and a probability of observation are correspondingly stored, a probability of observation corresponding to said packet loss rate, is to calculate again a packet loss count and a packet loss probability from said probability of observation, and is to estimate a packet loss count or a packet loss probability.

13. An estimating apparatus according to claim 12, wherein said estimating means unit is to repetitively calculate a packet loss count and a packet loss probability from a count of the degrees of inversion that can be observed under said predetermined sampling measurement and said probability of observation, and is to estimate a packet loss count and a packet loss probability.

14. An estimating apparatus according to claim 12, wherein said database is created by:

observing an inversion of a packet transmission sequence number under a full sampling measurement, measuring a count of sampled sequence numbers equal to or greater than the sequence number upon said inversion as a degree of inversion, and obtaining a distribution of the degree of inversion under the full sampling measurement for each packet loss rate;

based on said distribution of the degree of inversion under the full sampling measurement, estimating a distribution of the degree of inversion that can be observed under a predetermined sampling probability, and obtaining a probability of observation for each packet loss rate under the predetermined sampling probability; and creating the database with at least a packet loss rate and a probability of observation corresponding to each other.

15. A network measuring system for estimating packet losses or a packet loss rate, comprising:

a measurement means of a measuring apparatus installed at a halfway point of a network path between a transmitting apparatus and a receiving apparatus, to observe an inversion of a packet transmission sequence number under a predetermined sampling measurement, and to measure a count of sampled sequence numbers equal to or greater than the sequence number upon said inversion as degrees of inversion; and an estimating unit of the measuring apparatus, to obtain a probability of observation of the degrees of inversion that are observed under said predetermined sampling measurement from a ratio of a count of the degrees of inversion that are observed under said predetermined sampling measurement relative to a whole count of the degrees of inversion that are observed under a full sampling measurement, and to estimate a packet loss count or loss rate based on said probability of observation.

16. A network measuring system according to claim 15, wherein said estimating means comprises means estimating unit is to retrieve, from a database in which at least a packet loss rate and a probability of observation are correspondingly stored, a probability of observation corresponding to said packet loss rate, is to calculate again a packet loss count and a packet loss probability from said probability of observation, and is to estimate a packet loss count or a packet loss probability.

* * * * *